United States Patent
Berson et al.

(10) Patent No.: US 7,312,725 B2
(45) Date of Patent: Dec. 25, 2007

(54) DISPLAY SYSTEM FOR OPERATING A DEVICE WITH REDUCED OUT-THE-WINDOW VISIBILITY

(75) Inventors: Barry L. Berson, Northridge, CA (US); Larry J. Bialecki, Canyon Country, CA (US); Peter A. Buck, Valencia, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 840 days.

(21) Appl. No.: 10/616,145

(22) Filed: Jul. 8, 2003

(65) Prior Publication Data

US 2005/0007261 A1    Jan. 13, 2005

(51) Int. Cl.
*G01C 21/00* (2006.01)

(52) U.S. Cl. ............... 340/980; 340/461; 340/973; 345/9; 701/14

(58) Field of Classification Search ........ 340/973–975, 340/945, 946, 980, 461; 345/7–9, 221, 418, 345/619, 636, 633; 250/253, 336.1, 339.06, 250/339.11; 244/118.5, 129.3; 382/240, 382/233, 284; 701/1, 3, 14
See application file for complete search history.

(56) References Cited

U.S. PATENT DOCUMENTS

| | | | |
|---|---|---|---|
| 4,887,298 A | 12/1989 | Haigler | |
| 5,296,854 A * | 3/1994 | Hamilton et al. | 340/980 |
| 5,325,449 A | 6/1994 | Burt et al. | |
| 5,351,898 A | 10/1994 | Koehn | |
| 5,995,290 A * | 11/1999 | Noble | 359/630 |
| 6,163,309 A | 12/2000 | Weinert | |
| 6,199,008 B1 * | 3/2001 | Aratow et al. | 701/120 |
| 6,405,975 B1 * | 6/2002 | Sankrithi et al. | 244/1 R |
| 6,466,235 B1 * | 10/2002 | Smith et al. | 715/771 |
| 7,148,861 B2 * | 12/2006 | Yelton et al. | 345/8 |
| 2001/0048763 A1 * | 12/2001 | Takatsuka et al. | 382/154 |
| 2002/0113720 A1 * | 8/2002 | Derderian | 340/965 |
| 2003/0076280 A1 * | 4/2003 | Turner et al. | 345/7 |

OTHER PUBLICATIONS

Guell, Jeff; "FLILO (Flying Infrared for Low-Level Operations) an Enhanced Vision System", presented Apr. 2000 at SPIE AeroSense Conf2000 in Orlando, Florida.

Michael D. Uenking & Monica F. Hughes, The Efficacy of Using Synthetic Vision Terrain-Textured Images to Improve Pilot Situation Awareness, NASA Langley Research Center, 2002-01-2970, pp. 1-12, USA.

(Continued)

*Primary Examiner*—Brent A. Swarthout (57) ABSTRACT

A display system for a device with reduced out-the-window visibility includes a display processor that receives an image from a sensor, wherein the sensor is capable of providing a continuously updated image of an area outside the device that is obscured from view of an operator by a portion of the device's structure. The sensor image can be combined with symbols representing information regarding the operational state of the device. The combined sensor image and symbols are output to a display device that is positioned to provide a portion of the out-the-window field of view to the operator. The entire desired field of view for the operator is provided by the display device in combination with the out-the-window scene available through windows of the device.

43 Claims, 8 Drawing Sheets

OTHER PUBLICATIONS

Zia-Ur Rahman; Daniel J. Jobson; Glenn A. Woodell; Glenn D. Hines, Multi-sensor fusion and enhancement using the Retinex image enhancement algorithm, College of William & Mary, Williamsburg, VA and NASA Langley Research Center, Hampton, VA. USA.

NASA, Synthetic Vision Would Give Pilots Clear Skies All the Time, NASA Facts Online, http://oea.larc.nasa.gov/PAIS/SynthVision.html., pp. 1-3, FS-2000-02-48-LaRC.

NASA, Nasa's High-Speed Research Program, The eXternal Visibility System Concept, NASA Facts Online, http://oea.larc.nasa.gov/PAIS/HSR-Cockpit.html., Sep. 1998, FS-1998-09-34-LaRC.

Honeywell Inc., Primus Epic, http://www.cas.honeywell.com/bcas, Feb. 1998, Honeywell Inc., USA.

Thomas A. Horne, Displays: Cockpit Cinerama, AOPA Pilot, Sep. 2000, pp. 1-5, http://www.aopa.org/pilot/features/future0009.html., Aircraft Owners and Pilots Association.

Rockwell Collins, Inc., Flight Test Information, Synthetic Vision Information Systems, 2002, p. 1 http://www.rockwellcollins.com/syntheticvision/flight.html, Rockwell Collins, Inc., 2002.

Ernest Grimberg, Camera for Landing Applications, Proc. SPIE vol. 4363, Enhanced and Synthetic Vision 2001, Jacques G. Verly; Ed. Aug. 2001.

Dan Williams, Marvin Waller, Dan Burdette, Tom Doyle, William Capron, John Barry, Richard Gifford, Concept of Operations for Commercial and Business Aircraft Synthetic Vision Systems, Jun. 2000, pp. 1-64, Version 1.0 (Draft).

Sharon Otero Beskenis; David F. Green, Jr.; Paul V. Hyer and Edward J. Johnson, Jr., Integrated Display System for Low Visibility Landing and Surface Operations, NASA/CR-1998-208446. Jul. 1998, pp. 1-58.

The Boeing Company, Synthetic Vision Systems (SVS) Concept Assessment Report, FY 00, Contract NAS1-20342, Dec. 31, 2000, pp. 1-40.

Michael D. Uenking & Monica F. Hughes, The Efficacy of Using Synthetic Vision Terrain-Textured Images to Improve Pilot Situation Awareness, NASA Langley Research Center, 2002-01-2970, pp. 1-12, USA, Dec. 2002.

Zia-Ur Rahman; Daniel J. Jobson; Glenn A. Woodell; Glenn D. Hines, Multi-sensor fusion and enhancement using the Retinex image enhancement algorithm, College of William & Mary, Williamsburg, VA and NASA Langley Research Center, Hampton, VA. USA, Jul. 28, 2003.

NASA, Synthetic Vision Would Give Pilots Clear Skies All the Time, NASA Facts Online, http://oea.larc.nasa.gov/PAIS/SynthVision.html., pp. 1-3, FS-2000-02-48-LaRC., Feb. 28, 2003.

Thomas A. Horne, Displays: Cockpit Cinerama, AOPA Pilot, Sep. 2000, pp. 1-5, http://www.aopa.org/pilot/features/future0009,html., Aircraft Owners and Pilots Association.

Rockwell Collins, Inc., Flight Test Information, Synthetic Vision Information Systems, 2002, p. 1, http://www.rockwellcollins.com/syntheticvision/flight.html, Rockwell Collins, Inc., 2002, Jul. 18, 2003.

* cited by examiner

DISPLAY SYSTEM FOR OPERATING A DEVICE WITH REDUCED OUT-THE-WINDOW VISIBILITY

BACKGROUND OF THE INVENTION

Many devices, such as aircraft, are typically designed to provide a real-world view of the out-the-window scene for at least one operator to operate the device. In the past, a view of the scenery outside the device was provided through passive means, such as a cockpit windshield, or artificial means through sensors and displays.

Synthetic Vision Systems (SVS) present a completely artificial computer-generated view of the external environment to the crewmember(s). SVS displays are typically based on static geographical and cultural data supplemented by dynamic traffic information. Some implementations of SVS use Global Positioning Satellite (GPS) data to register the data base information dynamically to the aircraft's position and altitude. Supplemental sensors may be used to confirm the GPS position data or provide additional data (e.g., other aircraft, weather events, ground equipment). SVS can use both head-up and head-down displays. Displays can include an artificial out-of-the-window view (in all directions) and/or any number of symbolic and map presentations.

In contrast, Enhanced Vision Systems (EVS) supplement out-the-window vision via the use of camera/sensor imagery superimposed over real-world, or synthetic, imagery. EVS include sensors that can detect and display images of objects that pilots would not normally be able to see when looking through the cockpit window of an aircraft. For example, EVS can present data from sensors that can penetrate low-visibility weather conditions and darkness, such as radar or forward-looking infrared (FLIR). The data presented from the sensors is derived from the current environment and not from a computer database. EVS can be used on both head-down and head-up displays. Other features such as navigation enhancements and proactive systems to avoid controlled flight into terrain and runway incursions can also be integrated in EVS.

The development of synthetic and enhanced vision systems requires several different technologies: (1) camera systems to provide visual imagery; (2) communication technology for transmitting navigation information; (3) databases to provide terrain data for synthetic images and object signatures to support imaging sensors; (4) computer graphics systems to render synthetic images in real time; (5) onboard imaging sensors, such as solid state infrared or imaging RADAR, to provide scene information through darkness and adverse weather; (6) knowledge-based image interpreters to convert sensor images into a symbolic description; (7) for certain applications, projection technology for panoramic or holographic displays; and (8) navigation components integrated with a Global Positioning System or suitable navigation system.

Capabilities provided with SV and EV systems are gaining acceptance among aircraft crewmembers. In 1997, the National Aeronautics and Space Administration (NASA), the United States Federal Aviation Administration (FAA), along with several industry, airline, and university participants, began work on NASA's Aviation Safety Program (ASP). One purpose of the ASP is to develop technologies to enhance flight safety and enable consistent gate-to-gate aircraft operations in normal and low visibility conditions. Large format displays filled with high-resolution images and computer graphics are expected to be provided in the crewstation instead of, or in combination with, forward-looking cockpit windows. The systems being developed for the ASP use new and existing technologies, such as Global Positioning System signals, terrain databases, and sensors to incorporate data into aircraft cockpit displays. During ASP test flights, the crew flew approaches and landings from an aircraft equipped with a research cockpit and tested the ability to control and land the aircraft relying only on sensor and computer-generated images and symbology. Although the crews provided positive feedback on the capabilities of the system, windowless cockpits are not expected to be certified for use in commercial or general aircraft by the FAA until the year 2007 or beyond.

Currently, the FAA requires aircraft to provide out-the-window viewing capability with specified horizontal and vertical fields of view. In some circumstances, the configuration of aircraft designed for optimum performance at conditions such as supersonic flight can include a long, pointed nose for drag reduction. Additionally, most contemporary supersonic aircraft designs feature a modified delta wing optimized for high-speed flight that results in high angles of attack at lower speeds. The long nose and high angle of attack at low airspeeds impairs the FAA desired forward visibility of the flight crew during some phases of operation.

One solution to reduced cockpit out-the-window visibility includes a movable nose cone, such as the droop-nose design of the Concorde aircraft. A mechanical system with actuators allows the crew to move the aircraft nose from a cruise position to a "drooped" position for takeoff, landing, and ground operation. The droop nose configuration requires additional weight and space for the actuator system, and increases the complexity and weight of the aircraft, and could reduce aircraft reliability Still another solution to enabling the pilot to see outside the airplane during taxi, takeoff, approach and landing is to include cockpit windows at the lower front fuselage of the aircraft, instead of, or in addition to, the traditional location on the upper front fuselage. Such a configuration provides a window for each crewmember to view a limited portion of the runway during landing, as disclosed in U.S. Pat. No. 5,351,898 issued to Michael S. Koehn. Drawbacks associated with the configuration include increased drag due to the opening(s) in the bottom of the nose of the aircraft, and the loss of space in the nose for other aircraft components. Further, the windows provide very narrow horizontal and vertical fields of view that can impair the pilot's depth perception through lack of spatial references.

It is therefore desirable to provide a display system that overcomes the limitations currently associated with display system configurations for aircraft and other devices with reduced out-the-window visibility.

SUMMARY OF THE INVENTION

In one embodiment, a display system for a device with reduced out-the-window visibility includes a display processor operable to receive an image from a sensor of an area outside the device that is obscured from view of an operator by a portion of the device's structure. The sensor image can be combined with symbols representing information such as the operational state of the device. The combined sensor image and symbols are output to a display device that can be positioned to provide a portion of the out-the-window field of view to the operator that is obscured by the device. The entire desired field of view for the operator is provided by the displayed image in combination with the out-the-window scene available through windows of the device.

In yet another embodiment, an aircraft includes a crew-station with cockpit windows, a first flat panel display device for one crewmember, a second flat panel display device for another crewmember, and a display processor. The display processor receives a first sensor image of an area outside the aircraft that is obscured from view of the crewmembers by the nose of the aircraft. The display processor translates the first sensor image to the viewpoint of each crewmember and outputs the translated sensor images on the respective display devices. Each display device is positioned to provide a portion of a desired out-the-window field of view from the viewpoint of the respective crewmember. Each viewpoint is conformal to each pilots' viewpoint and provides a representation of the outside world that the pilot would be able to see if he/she could see through the structure. The entire desired field of view for each crewmember is provided by the respective display device in combination with the out-the-window scene available through cockpit windows of the aircraft.

In another embodiment, a display system is configured to receive an image from a sensor that provides a continuously updated image of an area outside the aircraft that is obscured from the view of a crewmember by a portion of the aircraft's structure. The sensor image is combined with symbols representing information regarding the operational state of the aircraft. The combined sensor image and symbols are output to a display device that provides a portion of a desired out-the-window field of view to the crewmember. The entire desired field of view for the crewmember is provided by combined sensor image and the out-the-window scene available through cockpit windows of the aircraft.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1:
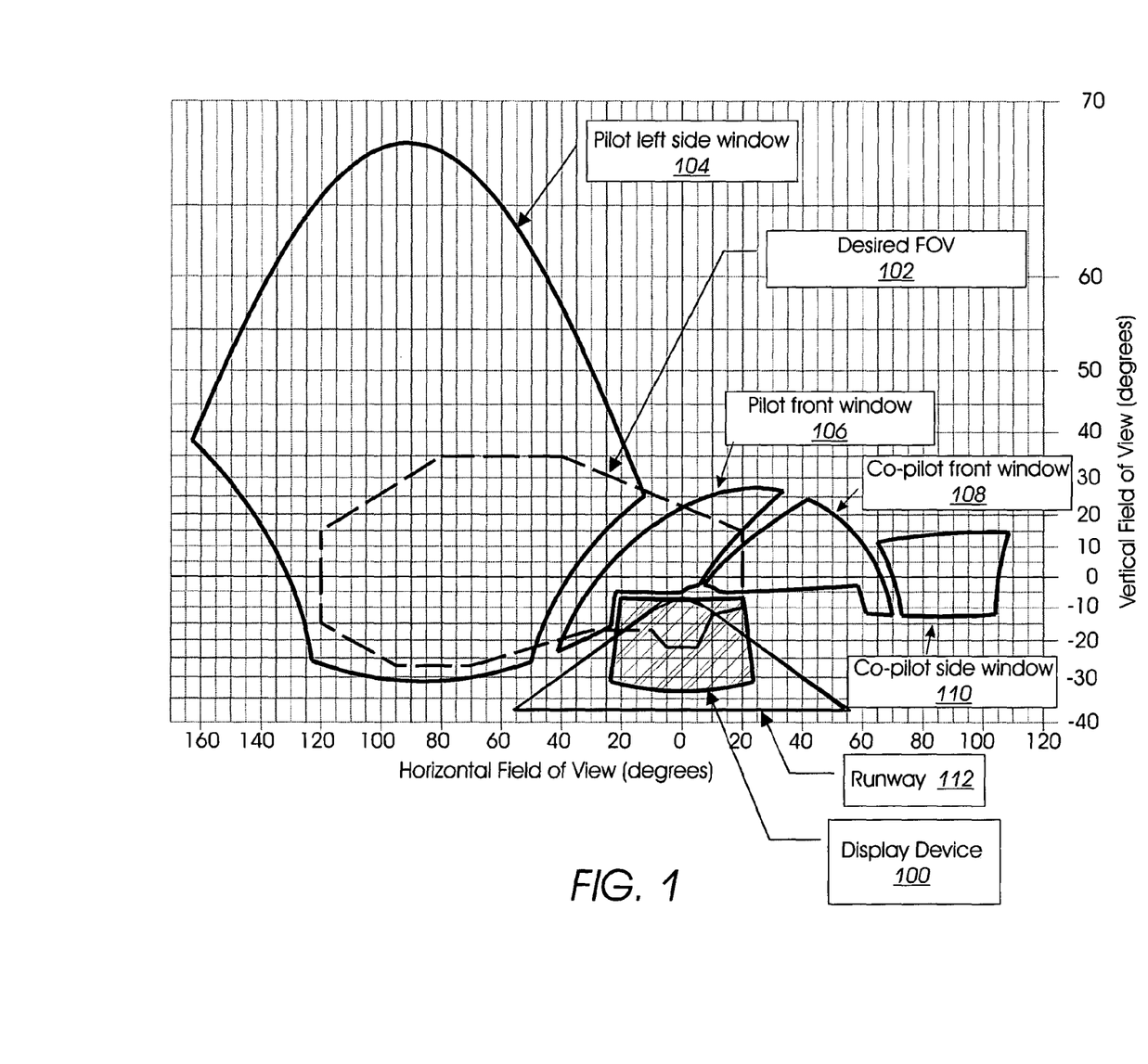
FIG. 1 is a diagram of an embodiment of a display device positioned to provide the desired FAA field of view for a crewmember in combination with out-the-window fields of view from cockpit windows (FAA Advisory Circular (AC) 25.773-1 entitled "Pilot Compartment View Design Considerations", dated Jan. 8, 1993.

FIG. 1 shows an embodiment of an out-the-window view from an operator's station combined with display device 100 that provides a portion of desired field of view (FOV) 102, as indicated by a dashed line. Desired FOV 102 can be derived from governmental or other regulations, such as set forth in the United States Federal Aviation Administration (FAA) Advisory Circular (AC) 25.773-1 entitled "Pilot Compartment View Design Considerations", dated Jan. 8, 1993. The out-the-window field of view areas for the operator in an exemplary aircraft are indicated by pilot left side window view 104, pilot front window view 106, co-pilot front window view 108, and co-pilot side window view 110.

While embodiments disclosed herein use an aircraft as an example of a device with a particular field of view desired for operation, the embodiments of a display system and display devices disclosed herein can be utilized in any device with a limited out-the-window field of view.

Figure 2:
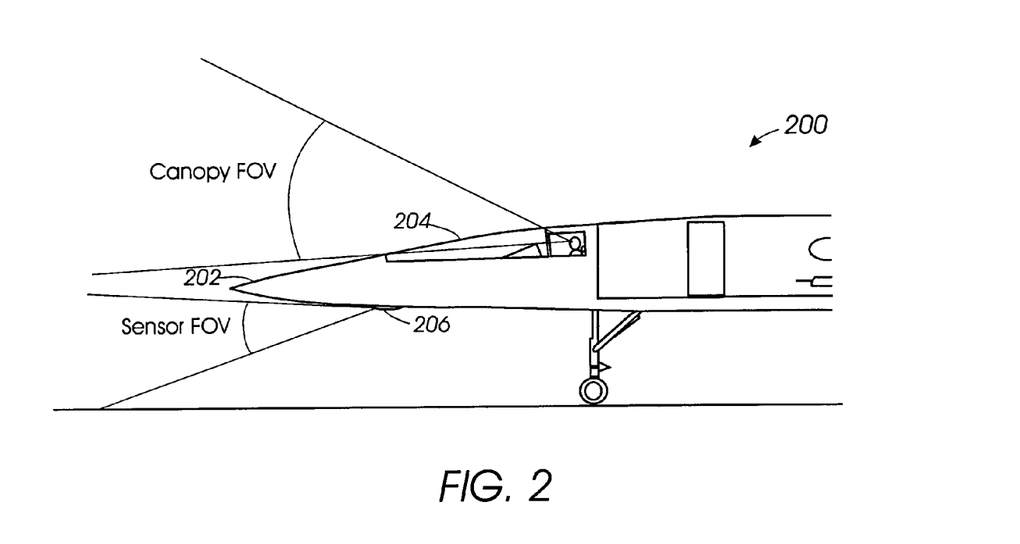
FIG. 2 is a diagram of an embodiment of an aircraft with a structural outer mold line that obscures a portion of a crewmembers desired field of view.
Figure 3:
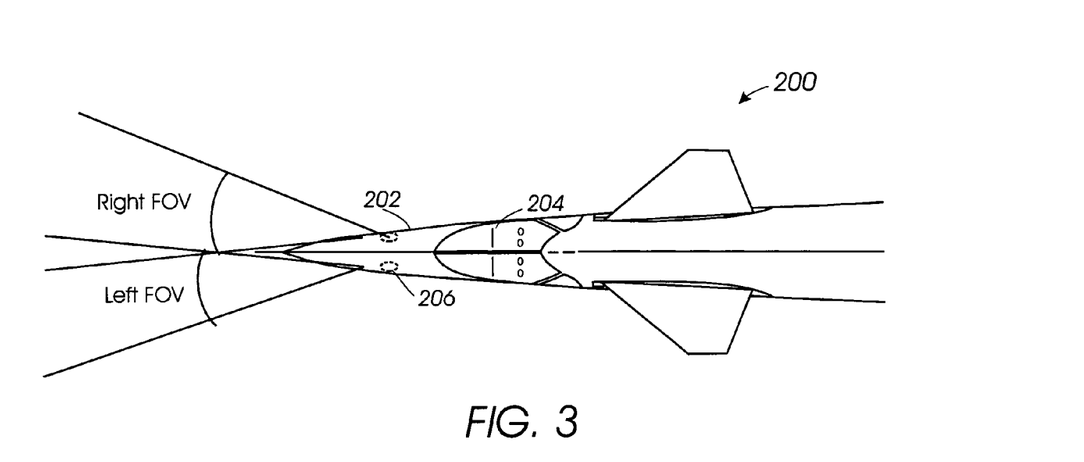
FIG. 3 is a side view diagram of the aircraft of FIG. 2.

Tradeoffs must typically be made between an aircraft's performance and other design goals, such as payload capacity, range, structural weight, speed, and fuel consumption of an aircraft. FIGS. 2 and 3 show an embodiment of an aircraft forward fuselage 200 with an outer mold line (OML) 202 and cockpit windows 204 that result in cockpit window views 104, 106, 108, 110 shown in FIG. 1. The nose of aircraft 200 is long and tapered, and designed to meet low sonic boom and high speed requirements, such as for a supersonic aircraft. A tradeoff is required, however, between the length and shape of OML 202 to achieve reduced sonic boom, and an OML 202 that allows cockpit windows 204 to be sized to provide desired FOV 102.

Embodiments of display 100 can be implemented to provide portions of the out the window visual scene to fill in the area of desired FOV 102 that is not visible from cockpit window views 106, 108. Runway 112 (FIG. 1) is shown in perspective to display 100, window views 104, 106, 108, 110, and desired FOV 102 with respect to the pilot of aircraft 200 during the flare portion of a landing sequence. Note that the shape and size of window views 104, 106, 108, 110 and display 100 can vary from the configuration shown in FIGS. 1, 2, and 3.

In some embodiments, aircraft 200 is configured with one or more sensors 206 that provide a visual image of at least a portion of the out-the-window scene that is blocked from the crewmembers' view by OML 202. Any one or combination of suitable sensors 206 can be utilized including, among others, video cameras, RADAR, and infrared (IR) sensors. Sensor(s) 206 can be mounted at any suitable location on aircraft 200 that allows sensor(s) 202 to detect the portion of the out-the-window scene to be provided for desired FOV 102. Depending on the location of sensor(s) 206, the image from each sensor 206 can be transformed to the viewpoint of each crewmember before being output to display 100.

Figure 4A:
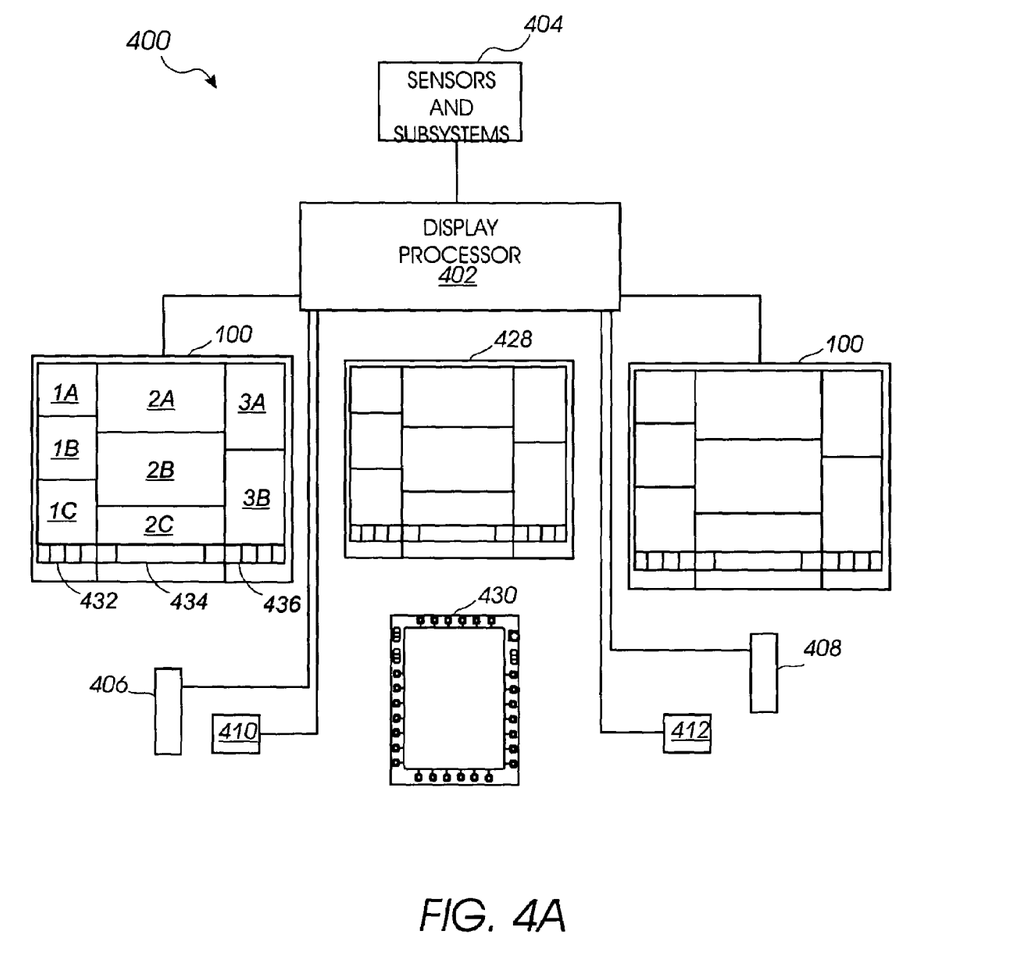
FIG. 4A is a diagram of an embodiment of a display system for the aircraft of FIG. 2.

Referring now to FIG. 4A, an embodiment of display system 400 includes display processor 402, which receives inputs from the subsystems and sensors 404 and the crew-station(s) including positions of switches and knobs (not shown), control sticks 406, 408, throttle levers 410, 412, and rudder pedals (not shown). Displays 100, 428, 430, control sticks 406, 408, and throttle levers 410, 412 can include a variety of switches for controlling the operational modes of displays 100, 428, 430, and subsystems and sensors 404.

Display processor 402 includes logic to determine whether the modes requested by the crewmembers are permitted based on the current mode of the components. Display processor 402 also provides data from subsystems and sensors 404 and other aircraft components, as well as the operational mode of subsystems and sensors 404, to display processor 402, which generates avionics displays 416 and any other indicators, such as lights and sounds. Mode control and option selections are also output from display processor 402 to control operational modes of various subsystems and sensors 404.

Additionally, display processor 402 can be embodied in any suitable computing device using any suitable combination of hardware, software, and/or firmware, such as microprocessors, Field Programmable Gate Arrays (FPGAs), Application Specific Integrated Circuit (ASICs), or other suitable devices.

Figure 5:
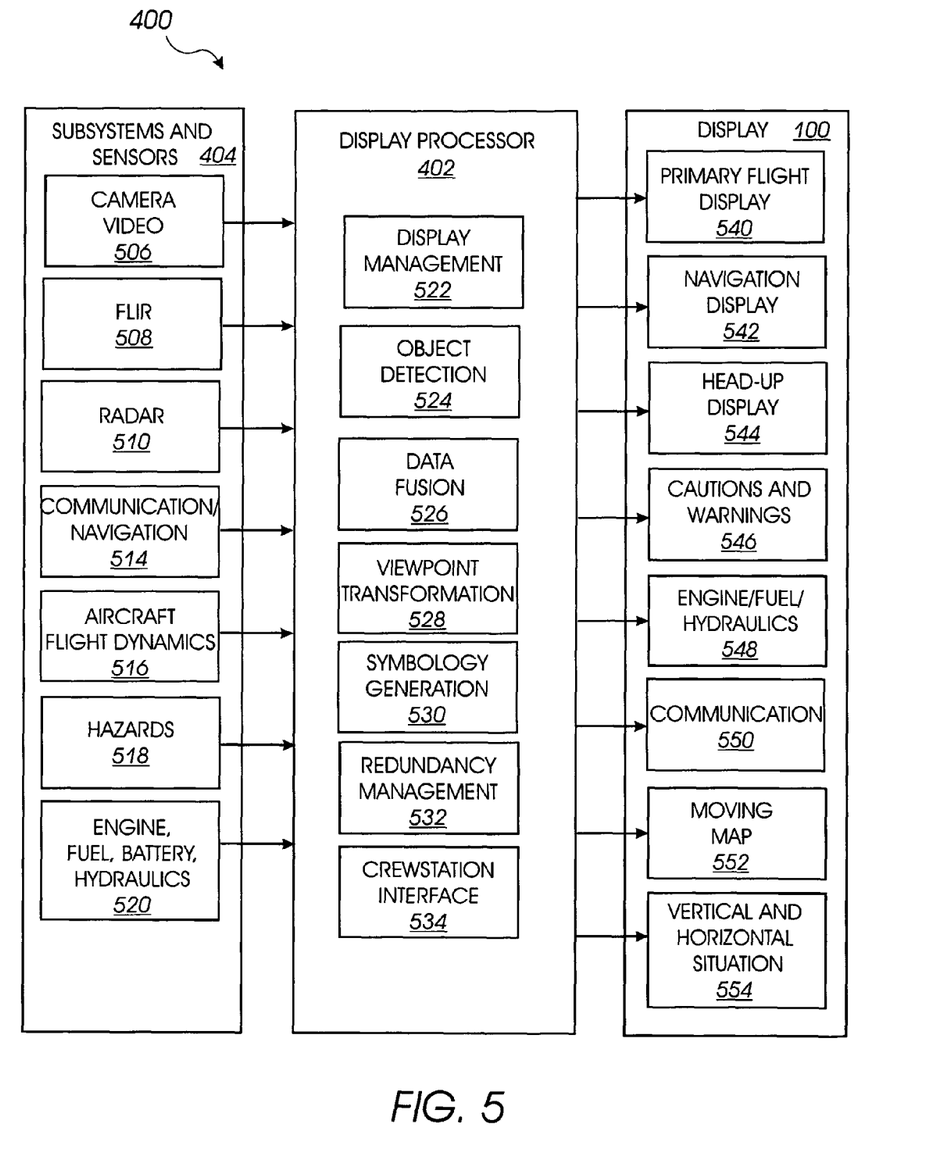
FIG. 5 is a diagram of an embodiment of components that can be included in the display system of FIG. 4A.

Referring to FIGS. 4A and 5, an example of components that can be included in embodiments of display system 400 is shown with images and data supplied to display processor 402 from a variety of subsystems and sensors 404, such as camera video 506, Forward-Looking Infrared (FLIR) sensor 508, RADAR sensor(s) 510; communication and navigation systems 514; aircraft flight dynamics sensors 516; hazard sensors 518; and engine, fuel, battery, and hydraulics subsystems 520. Other suitable subsystems and sensors 404 can be utilized for a particular device in addition to, or instead of, the components shown in FIG. 5.

Display processor 402 includes one or more data processing devices configured to perform a variety of functions, such as display management 522; object detection 524; data fusion 526; viewpoint transformation 528; symbology generation 530; redundancy management 532; and crewstation and display interface 534. The output of display processor 402 is presented to the crewmember(s) on one or more displays 100, 428, 430, and can include, for example, a primary flight display 540; navigation display 542; head-up display 544; cautions and warnings display 546; engine, fuel, battery, and hydraulics display 548; communication system display 550; moving map display 552; and vertical and horizontal situation displays 554.

Subsystems and Sensors

Camera video sensor 506 can be included in subsystems and sensors 404 to provide a video image of a field of view in front of and below the aircraft 200 (FIG. 2). Images from camera video sensor 506 are useful to provide the crew with images of surrounding scenery obscured by the aircraft's OML 202 (FIG. 2) for all expected ambient conditions (e.g., day/night, good and poor visibility). Scenery images from camera sensor 506 can also be presented directly to the crewmembers on display 100 to assist the crew in operating aircraft 200 in manual and autopilot modes. Images from camera video sensor 506 can be analyzed to provide data for functions in display processor 402 such as object detection 524, data fusion 526, redundancy management 532, and symbology generation 530.

Forward Looking Infrared (FLIR) sensor 508 provides an infrared spectrum video image of a field of view in front of aircraft 200 (FIG. 2). FLIR images provide the ability to view surrounding scenery in day, night, and all-weather conditions. Additionally, display processor 402 can analyze FLIR images to monitor the integrity of data being used in display system 400, and detect objects around aircraft 200. FLIR sensor 508 can thus provide data for functions in display processor 402 such as object detection 524, data fusion 526, redundancy management 532, and symbology generation 530. Scenery images from FLIR sensor 508 can also be presented directly to the crewmembers on display 100 to assist the crew in operating aircraft 200 in manual and autopilot modes.

RADAR sensor(s) 510 can include one or more different types of RADAR sensors to provide information regarding weather, air and surface traffic, precision velocity measurement for navigation system updates, altitude above ground information, scene imagery to the pilot in low visibility conditions, object detection (either directly through pilot scene interpretation, or automatically), and to monitor the integrity of data being used in display system 400. Raw data can be provided in the form of scanned RADAR returns, azimuth versus range, at incrementally selected elevations. Processed RADAR data can also be provided to aid in object detection. Information from RADAR sensor(s) 510 can be used in display processor 402 for functions such as object detection 524, data fusion 526, symbology generation 530, and redundancy management 532.

With regard to communication and navigation subsystems 514, aircraft communication subsystems typically include Very-High Frequency/Ultra-High Frequency (VHF/UHF) communication systems to provide air-to-air and air-to-ground communications. Another communication subsystem that can typically be found on an aircraft is an Intercommunication and Audio System (IAS) to amplify and route audio signals within the cockpit, the aircraft, and to air traffic controllers. The IAS can also provide supplemental and backup communication, radio navigation, and identification (CNI) controls, aircraft warnings and advisories, and voice alerting. Other communication systems, such as a satellite communication system, data link, and high frequency radio systems, among others, can also be included.

Navigation components in communication and navigation subsystems 514 can include a variety of subsystems such as Tactical Air Navigation (TACAN), which is used to determine the relative bearing and slant range distance to a TACAN ground station. The TACAN is also used as a source to keep aircraft present position and update the aircraft present position being kept by another source, such as an inertial navigation system (INS) or air data computer (ADC). The INS subsystem is a self-contained, fully automatic dead reckoning navigation system. The INS can be coupled to a Global Positioning System (GPS) to provide highly accurate aircraft present position and velocity data. The INS detects aircraft motion (acceleration and attitude) and provides acceleration, velocity, present position, pitch, roll, and true heading to related systems. The GPS is a space satellite based radio navigation system that provides continuous, all weather, passive operation to an unlimited number of users anywhere on the earth. The Air Data Computer (ADC) can provide calibrated airspeed, pressure altitude, Mach number, and vertical speed (rate of change of pressure altitude). The ADC can receive inputs from other subsystems and sensors 404. Errors in the data can be corrected in the ADC and the corrected signals can be used by display processor 402 to compute accurate air data and magnetic heading information. ADC outputs can be used for primary flight displays 540, navigation, altitude reporting, environment control, and unsafe landing warnings.

Other components in communication and navigation subsystems 514 can include an Attitude Heading Reference System (AHRS), which is a self-contained attitude reference system that provides backup pitch, heading, and roll attitude for use by other subsystems. An Instrument Landing System (ILS) is an all weather runway landing approach guidance system. The ILS decodes transmitted azimuth and elevation signals during an aircraft approach and provides steering information to be displayed on Head-Up Display (HUD) 544, the Vertical and/or Horizontal Situation Indicator Display (HSID) 554, and/or other appropriate displays 100. Other suitable components can be utilized in communication and navigation subsystems 514, in addition to, or instead of, the components mentioned herein.

Digital Map Set (DMS) can also be included as part of communication and navigation subsystems 514 to provide an image of the terrain and obstacles that is overlaid by textual information. For example, the map image from a DMS can be overlaid by text and symbols, and the map image can be continuously updated during flight to provide a bird's eye view of the position and heading of the aircraft relative to the terrain and various landmark features to the crewmembers. Current flight path, and deviation from a pre-specified flight path, can also be shown. The DMS display can be provided on a dedicated display device, such as display device 428 in FIG. 4A, or included in one of the windows of display 100.

Communication and navigation subsystems 514 can also include a terrain map database that provides latitude, longitude, and elevation data for terrain and man-made structures of potential significance to hazard avoidance. The database may include nested components in hardware and/or software, with varying resolution and accuracy, appropriate to the phase of flight anticipated in the represented region. The terrain map information can be used by display processor 402 in object detection 524, data fusion 526, symbology generation 530, and sensor redundancy management 532.

An automatic flight control system (AFCS) can also be included in communication and navigation subsystems 514 to provide autopilot and automatic throttle control (ATC) mode commands to actuators connected to the control surfaces and throttle levers. The autopilot mode maintains a constant heading, altitude, speed, and/or attitude. The ATC mode positions the engine throttle levers and power lever control to maintain a constant angle of attack during landing, with approach power compensation, or constant airspeed during flight with a velocity control system. A flight management system (FMS) can be integrated with the AFCS to allow the crew to select options to fly the most economical flight profile or choose the fastest route to a destination. As the flight proceeds, the FMS can track fuel-burn and winds, update estimated flight time, and automatically change navigation and communication radio frequencies. The FMS can control the flight from takeoff through landing, and perform navigation functions including determining waypoints, course intercepts, estimated time of arrival, holding patterns, altitude crossing restrictions, and optimum holding speed.

Communication and navigation subsystems 514 can also include an ADS-B, which receives positional and altitude information and provides the crewmembers with situational awareness information regarding the location of other aircraft in relation to their own aircraft. ADS-B information can be overlaid on various display formats. In addition, RADAR information obtained from off-board sources can be transmitted to the aircraft and displayed to aid pilot situational awareness.

Other suitable components can be utilized in communication and navigation subsystems 514, in addition to, or instead of, the components mentioned herein.

Aircraft flight dynamics sensors 516 provide information regarding aircraft angle of attack, ambient air temperature outside the aircraft; a pitot static system to measure aircraft velocity with pitot and static pressures surrounding the aircraft; an indicated airspeed (IAS) value based on the pitot and static pressure; a backup pressure altimeter value based on static pressure; and a vertical speed (climb or dive rate) indicator value based on changes in static air pressure.

Hazard sensors 518 can include an integrated caution and warning (ICAW) system to filter extraneous messages and inform crewmembers of specific problems. For example, when an engine fails, the generator and hydraulic cautions normally associated with an engine being shutdown are suppressed, and the crewmembers are provided the specific problem in the form of an engine shutdown message.

A Traffic Alert and Collision Avoidance System, or TCAS can be included in hazard sensors 518 to provide information for display 100 showing the relative positions and velocities of other aircraft, and issue an alarm when another aircraft is on a path to pass within a predetermined range to the subject aircraft.

A Flight Incident Recorder and Monitoring System (FIRAMS) can be included in hazard sensors 518 to monitors engine and airframe operational status for component failures and caution/advisory conditions when the display processor 402 is operating. If the display processor 402 detects a component failure, display processor 402 can command the FIRAMS to store the applicable maintenance code. When display processor 402 detects specific unit failures, FIRAMS 512 can store significant maintenance data and selected tactical information in a memory device.

Engine, fuel, battery, and hydraulics sensors 520 provide information regarding the aircraft's engine, fuel, hydraulics, and electrical system, including battery power supply status, AC-DC transformer/rectifier status, engine start indicators, and backup batteries, fuel remaining, and hydraulic pressure.

Display Processor

FIG. 4A shows a diagram of an embodiment of a configuration of displays 100, 428, 430, in which one or more of displays 100, 428 can be partitioned into several mutually exclusive display areas, referred to as display windows 1A through 3B. Various types of information can be displayed in windows 1A through 3B based on the types of functions being performed by components in display system 400, devices being monitored via display system 400, and functions performed by devices that communicate with display system 400.

Display management function 522 can cause certain types of information to be automatically assigned to a particular window of display 100 based on the purpose for which display 100 is being used. For example, the Federal Aviation Administration requires certain primary flight information to be available to the crewmembers at all times during flight. Accordingly, the primary flight information can be automatically placed in fixed locations on display 100, depending on the aircraft's flight phase, and the role being performed by a particular crewmember. Under certain circumstances, each crewmember can then configure the remaining windows of display 100 based on their own preferences to satisfy current mission requirements.

In some embodiments, display management 522 presents a default window configuration for each crewmember based on the crewmember's role, and the operational state of the aircraft. Display 100 can include options to select between different roles that a crewmember can assume. For example, a crewmember can choose between role options as primary pilot, co-pilot, flight engineer, maintenance personnel, or flight attendant. When a crewmember switches from one role to another, the default configuration for the new role can automatically replace the information displayed on the crewmember's display 100. The default window configurations can be preset by the crewmember to display information and options that are preferred by the crewmember when performing each particular role. A default set of options and information can be presented that is most likely to be useful to the crewmember assuming the role. Different preset configurations can be developed for each unique phase of flight (e.g., taxi, takeoff, climb, approach, landing, etc.).

One or more of windows 1A through 3B, such as windows 1C, 2C, and/or 3B, can be designated as common windows associated with a subset of two or more of the remaining windows 1A, 1B, 2A, 2B, 3A. For example, window 1C can be a common window associated with windows 1A through 1B; window 2C can be a common window associated with windows 2A through 2B; while window 3B can be independent of other windows 1A through 3A. Other arrangements and combinations of window and common windows can be utilized based on the types of information a user will be viewing, and the utility of having a common window 1C, 2C associated with two or more of the other windows 1A, 1B, 2A, 2B, 3A.

An option area 432, 434, 436 can be associated with each common window 1C, 2C, and window 3B, respectively, to allow the user to customize the information in windows 1C, 2C, and 3B. The capability to customize the information in one or more windows 1C, 2C, and 3B provides user configurable workspace on display 100 while retaining the information in the other windows. For example, options area 422 can include several options for displaying more detailed information in common window 1C that is related to the information displayed in either of windows 1A or 1B. Common window 1C can include a scroll feature to allow the user to scroll through the detailed information, while the less detailed information continues to be displayed in windows 1A and/or 1B.

Display management 522 can be configured to determine when functions being performed in display system 400 are in a predefined state. Display management 522 can also monitor the operational status of various components in display system 400. When display management 522 detects one of the predefined states, relevant information regarding the state can be presented in one of windows 1A, 1B, 2A, 2B, 3A, or 3B. In some circumstances, the crewmember cannot change the information regarding the state while the aircraft remains in the state. The crewmember can, however, choose options associated with the respective window 1C, 2C, or 3B to retrieve more information about the detected state, as well as information related to the information in other associated windows 1A, 1B, 2A, 2B, 3A.

In some embodiments, display 100 covers the entire visible display area of the display device. Additionally, windows 1A through 3B do not overlap each other, thereby providing the user with an unobstructed view of all the information on display 100.

The selectable features in option areas 432, 434, 436 that allow the crewmember to customize windows 1C, 2C, and 3B can be implemented in any suitable manner, such as computer-generated graphic features that are selectable via a touch screen overlaid on display 100, a movable cursor on display 100, and/or with hardware features such as push-button switches that are mounted adjacent display 100. In other embodiments, the selectable options to customize common windows 1C, 2C, and 3B can be located on other components of display system 400, or other suitable areas, that are accessible by a user. In some embodiments, a voice recognition system can be included to interact with displayed information.

Other techniques for controlling the appearance of display 100 can also be provided, such as automatic and manual declutter display modes, color-coding, and display scaling. Further, other combinations of information and number/size of windows can be implemented for display 100. A lock out feature can also be included to help crewmembers coordinate their efforts by preventing them from attempting to control operation of the same subsystem simultaneously. Alternatively, control can be given to the last crewmember who makes an input.

With regard to other functions performed by display processor 402, in some embodiments of Object Detection 524 and Data Fusion 526 functions, information can be combined, also referred to as fused, to provide a composite image for displays 100 using the best information available from various sources. Various suitable sensor fusion algorithms can be utilized to fuse data from subsystems and sensors 404. For example, data from the terrain map database can be compared to measured terrain height variations from a RADAR altimeter, INS, and GPS along the aircraft flight path to estimate the position of the aircraft. Images from camera video sensors 506, RADAR sensors 510, and FLIR sensors 508 can be fused to form a composite out-the-window scenery image using any suitable image sensor fusion algorithm, such as described by Z. Rahman, D. J. Jobson, G. A. Woodell, and G. D. Hines, in a publication entitled "Multi-Sensor Fusion And Enhancement Using The Retinex Image Enhancement Algorithm," Visual Information Processing XI, Proc. SPIE 4736, (2002). Data from a 3-dimensional terrain map database can be used to fill in portions of data that is not available from camera video sensors 506, RADAR sensors 510, or FLIR sensors 508. The fused image can be combined with display symbology to provide an enhanced vision image for display 100.

Figure 4B:
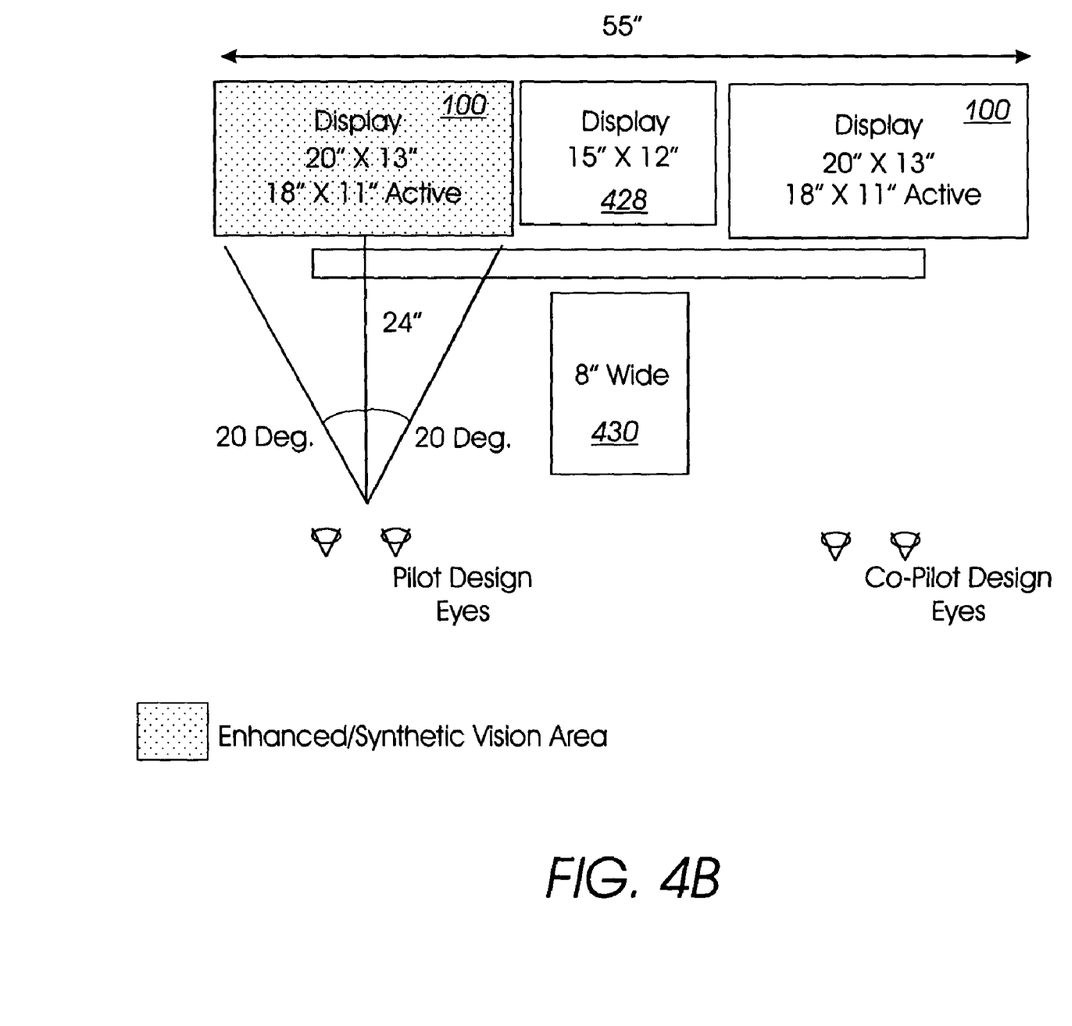
FIG. 4B is a front-view diagram of a particular embodiment of the display system of FIG. 4A.
Figure 4C:
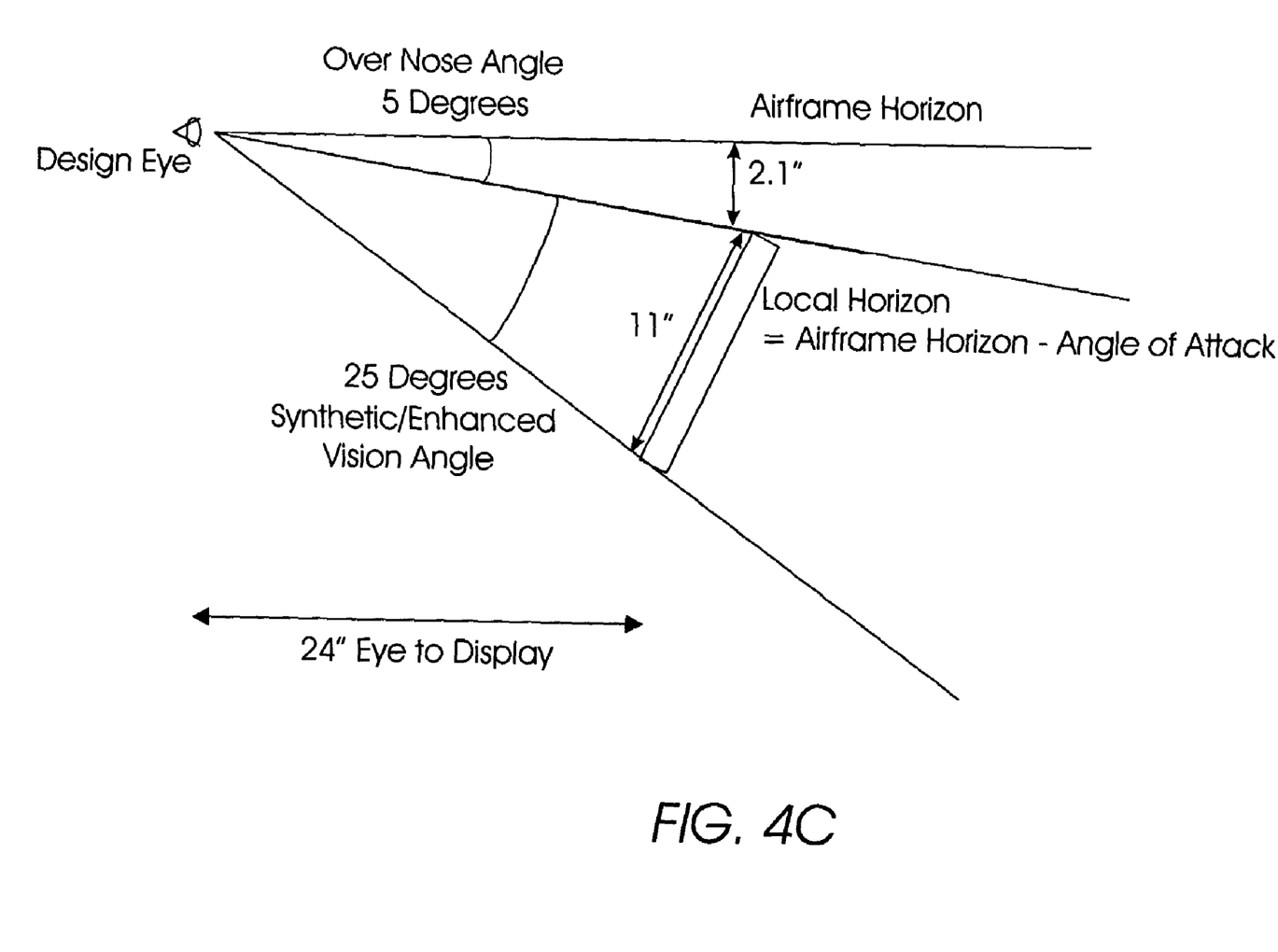
FIG. 4C is a side-view diagram of the particular embodiment of the display system of FIG. 4B.

Depending on the field of view for each image sensor, and the viewpoint of each crewmember, display processor 402 performs viewpoint transformation functions 528 to align images from subsystems and sensors 404, and translate the images to register with the viewpoint of each crewmember. FIGS. 4B and 4C show front and side view diagrams of a particular geometric configuration of displays 100, 428, 430 that can be included in an embodiment of display system 400 of FIG. 4A. The design eye represents the position of each crewmember's eye. Typically, the design eye refers to the $50^{th}$ percentile (eye height) pilots' eye position, with the seat at its neutral seat reference point, when the pilot is seated at the location typically used to fly the aircraft. Current design practices use a design eye ellipse or line that enables $5^{th}$ through $95^{th}$ percentile operators to have the same over the nose vision capability. This allows the larger pilots to sit higher up and further away from the main instrument panel, etc. Displays 100, 428, 430 are flat panel display devices, with active display areas of 18 by 11 inches, 15 by 12 inches, and 8 by 8 inches, respectively. Other display sizes can be utilized. The active area of displays 100 provide a −20 to +20 degree horizontal field of view, and a −10 to −30 degree vertical field of view, twenty-four (24) inches from each crewmember's design eye. The outline of display 100 from the pilot's design eye is shown in FIG. 1.

Referring again to FIGS. 4A and 5, viewpoint transformation function 528 uses dimensional information from the crewstation, as well as aircraft flight dynamics information 516 (FIG. 5) to crop, rotate, and translate images to be conformal to the out-the-window view for each crewmember. In some embodiments, the following processes occur in viewpoint transformation function 528:

rotate the image about the viewpoint x, y, and z axes;
translate the image in the x, y, and z directions by an amount equal to the (negative) displacement of the viewpoint from the origin in the x, y, and z directions, respectively; and
scale and crop all images to the same field of view; and
output the images to displays 100 and 428.

Images used to provide a portion of desired FOV 102 (FIG. 1) can be scaled to be conformal with the real world scenery for each crewmember's viewpoint. Appropriate coordinate system transformation matrices for different reference systems can be used, based on the original coordinate system of the image, and the coordinate system used for the design eye(s).

Symbology generation function 530 of display processor 402 receives data from subsystems and sensors 404, with respect to aircraft position and state, as well as sensed external position and hazards.

Data from subsystems and sensors 404 can be analyzed in redundancy management function 532 to determine the most accurate data to use in symbology generation function 530, as well as information from object detection function 524, and data fusion function 526 with regard to hazard detection, identification, prioritization, and fused sensor imagery. Data from other subsystems and sensors 404 with respect to cleared path, terrain hazards (TAWS), and system integrity and status can also be utilized to generate symbols to display information on displays 100, 428, 430.

In some embodiments, multiple image sensors, such as camera video sensor 506, FLIR sensor 508, and/or RADAR sensor 510, can be used, with each sensor positioned in aircraft 200 to provide images that are aligned with one crewmember's design eye viewpoint. If one sensor fails, the image from the other sensor can be transformed to each crewmember's viewpoint, thereby improving the reliability of display system 400.

Crewstation interface function 534 receives input from the crewmembers including positions of stick 406, 408, throttles 410, 412, and rudder pedals (not shown), changes in switch and knob positions, and display option selections. The crewmembers' input is used by other functions in display processor 402 to determine the appropriate display elements to output to displays 100, 428, and 430.

Displays

Displays 100, 428, 430 in FIG. 4A can replace traditional aircraft instrument panels, and provide a portion of the out-the-window scenery in all weather and time of day conditions, even when the scenery is obscured by outer mold line (OML) 202 (FIG. 2) of aircraft 200. Displays 100, 428, 430 can also provide interactive presentations of flight and subsystem mode information, and allow crewmembers to operate and monitor various subsystems and sensors 404 on the aircraft at any particular time.

Figure 6:
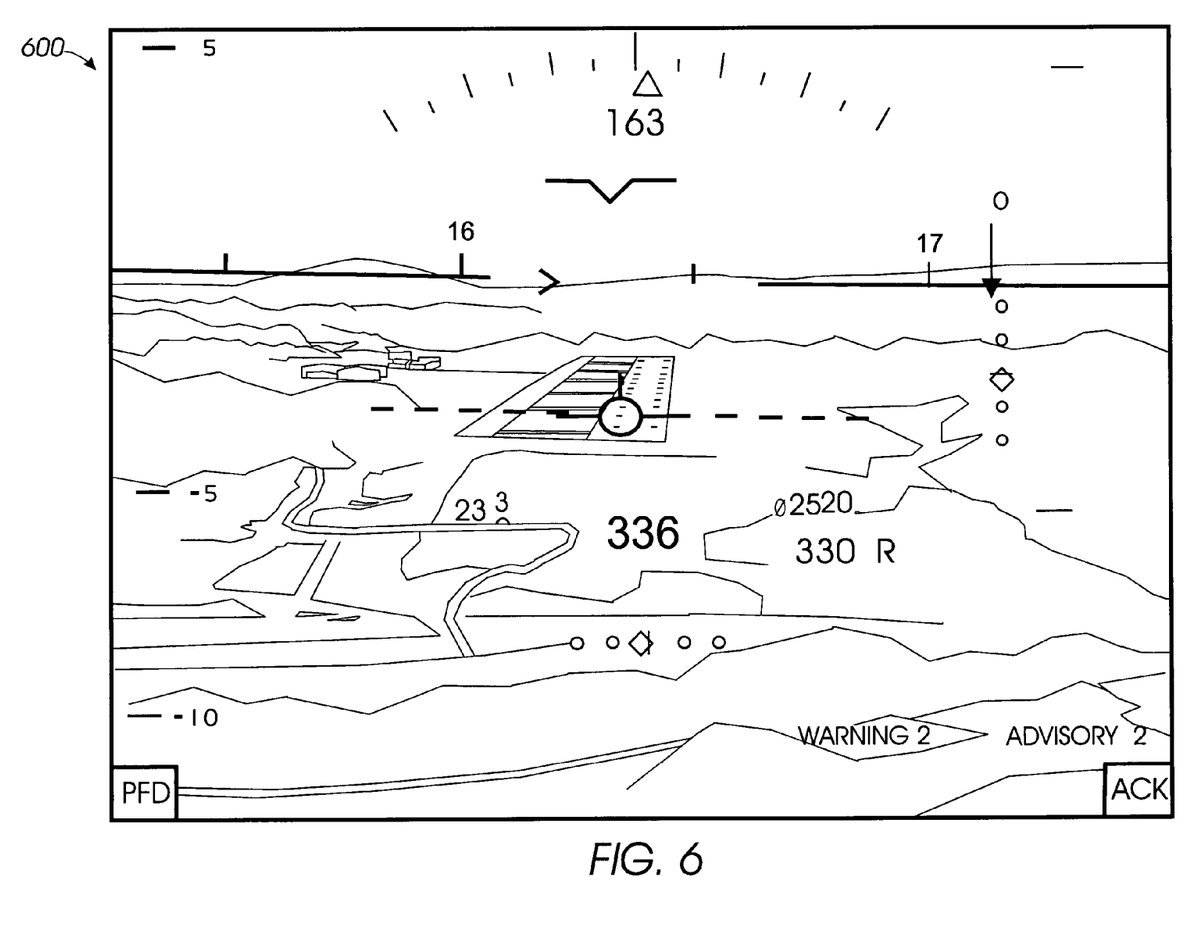
FIG. 6 is a diagram of an embodiment of an avionics display generated by the display system of FIG. 5.

FIG. 6 is a diagram of an embodiment of an avionics display 600 that can be generated by the display system 400 of FIGS. 4A and 5. In some embodiments, display processor 402 (FIG. 4A) generates display 600 below a pre-specified altitude, such as 18,000 feet, for example, and presents display 600 to the crewmember designated as pilot-in-command of the aircraft. Display 600 includes an image of out-the-window (OTW) scenery 602 that provides a field of view to the crewmember that meets or exceeds the portion of desired FOV 102 (FIG. 1) that is not available from window views 104, 106, 108, 110 (FIG. 1). In some embodiments, OTW scenery 602 is overlaid with head-up-display symbology that provides pitch, roll, yaw, speed, and altitude information, as well as navigation, and cautions and warning information.

Figure 7:
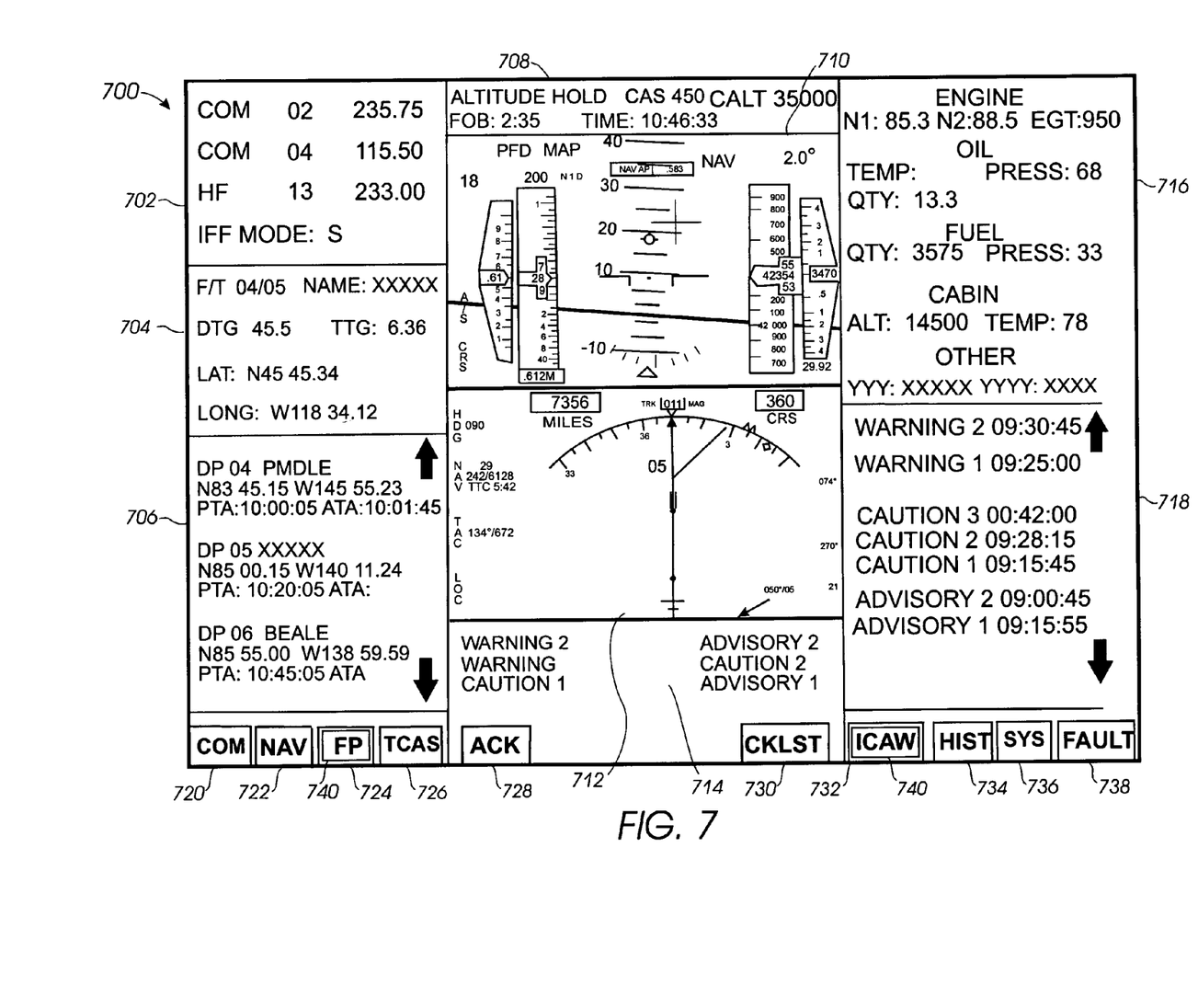
FIG. 7 is a diagram of an embodiment of another avionics display generated by the display system of FIG. 5.

FIG. 7 shows an embodiment of avionics display 700 that includes information generated by display system 400 (FIGS. 4 and 5). Display 700 includes communication system window 702, navigation window 704, common window 706 (currently displaying navigation waypoint information), primary information window 708, Attitude Direction Indicator (ADI) window 710, Horizontal Situation Indicator display (HSID) window 712, common window 714 (currently displaying caution and warning information), engine status window 716, and common window 718 (currently displaying cautions and warnings information). Primary information window 708 is used to present current mode information for the autopilot and flight management system, and to provide additional current flight, fuel and time information. Primary information window 708 aids pilot situational awareness by providing a dedicated display space for autopilot/FMS mode awareness, along with other important flight information. ADI window 710 provides flight attitude, altitude, speed, and navigation steering information. HSID window 712 provides aircraft attitude, steering, and navigation information superimposed on a moving map of the geographic area around the aircraft that is generated by a digital map set (DMS) in subsystems and sensors 404 (FIG. 5). HSID window can also display traffic and weather information (i.e., location of storm cells, etc.).

The embodiment of avionics display 700 shown in FIG. 7 also includes communication subsystems (COM) option 720, navigation subsystems (NAV) option 722, flight planning subsystem (FP) option 724, traffic alert and collision avoidance subsystem (TCAS) option 726, acknowledge (ACK) option 728, checklist (CKLST) option 730, integrated cautions and warnings (ICAW) subsystem option 732, subsystem history (HIST) option 734, subsystem (SYS) option 736, and subsystem diagnostics (FAULT) option 738. Crewmembers can choose options 720 through 738 to view more detailed information about the aircraft's operation and subsystems in common windows 706, 714, and 718.

The options shown for common window 706 include Corn option 720 to view and control the aircraft's communication system 704; NAV option 722 to view and control various aspects of navigating the aircraft; FP option 724 to review and modify the aircraft's flight plan; and TCAS option 726 to view more information regarding other aircraft or obstacles in the vicinity of the aircraft. When a particular one of options 720 through 726 is selected, an indicator of the option selected, such as selected box 740 or lighted pushbuttons, can be utilized. For example, a green light can indicate a selected option, and white light can indicate the option is available for selection. In other embodiments, the legends associates with options 720 through 726 can change color to indicate status, for example, white legends indicate the functions are available for selection, and green legends indicate the function is active.

When a particular option 720 through 726 is selected, the information in common window 706 changes to display with information requested by the user. A display option tree can be implemented to allow each crewmember to access increasingly detailed levels of information in common windows 706, 714, 718 independently from one another. While a first crewmember is monitoring engine performance, for example, the other crewmember can view and change the flight plan. Additionally, when COM option 720 is selected by one crewmember, options 720 through 726 on the respective display 700 change to another set of options to access another level of information that is available for the selected COM option 720. The sublevels can include a feature, such as BACK option, to return to the previous level. In the meantime, the information on the other crewmember's display 700 is unaffected, unless the option selected by the first crewmember changes the operating mode or other information that is common to both displays 100 (FIG. 4A).

Acknowledge (ACK) option 728 and checklist (CKLST) option 730 are associated with the Integrated Caution Advisory and Warning subsystem (ICAW) 706. In the embodiment of display 700 shown, messages generated by ICAW system 706 appear in window 714. A limited number of individual ICAW messages can appear at one time in window 714, and additional information about the messages can appear in window 718 when ICAW option 732 is selected. The ICAW messages in window 714 can be cleared by selecting ACK option 728. When additional messages are available, they replace the caution and warning messages that are cleared when ACK option 728 is selected.

ICAW subsystem in subsystems and sensors 404 (FIG. 5) includes an electronic checklist feature that is accessed via CKLST option 730. When an ICAW message is displayed in window 714, the crewmember can depress CKLST option 730 to view the associated checklist in window 714. When multiple ICAW messages occur, the crewmember can move an indicator over the desired ICAW and select ICAW option 732 to view a checklist for the problem indicated by the message. Associated checklists can be automatically linked together so that if an engine failure occurs, the pilot will not only get the checklist for the engine failure procedure in-flight but also the single engine landing checklist. Crewmembers can also manually page through the checklists at any time by selecting CKLST option 730.

Subsystem history (HIST) option 734 can be selected to display operational history for the subsystem selected with subsystem (SYS) option 736. FAULT option 738 can be selected to initiate diagnostic procedures, commonly referred to as Built-in-Tests (BIT), on the selected subsystem. The results of the BIT are displayed in window 718. Various sublevels of options can be implemented for options 728 through 738, including a display navigation feature, such as BACK option, to return to the previous level.

Referring to FIGS. 4A, 6, and 7, display 428 can be used to provide access to avionics display 700 when display processor 402 forces primary flight display 600 to be presented on the pilot-in-command's display 100. Display 428 can also be used to present other types of displays to the crewmembers, in addition to, or instead of, displays 600 and 700.

Display 428 can be used to bring up synoptic displays for the various subsystems that are capable of being controlled via a data bus. Display 428 provide information on the status of the subsystems, as well as provide controls to enable the operator to interact with the subsystems. Display 428 can also be used to present a large moving map display that can show the position of the air vehicle in relation to its intended flight plan and cultural features. Weather, traffic, and air traffic control data link information can also be superimposed on display 428. Display 428 could also be used to present ATC data link messages.

Referring again to FIGS. 1 and 2, display 100 minimizes the number of dedicated control panels and display devices that are typically used to monitor and operate an aircraft and its subsystems, while providing portions of the out-the-window field of view that is obscured by the aircraft's outer mold line (OML) 202. A reduced number of display devices results in decreased weight, increased system reliability, and reduced maintenance. Further, displays 100 provide enhanced situational awareness of the aircraft and the subsystems, and reduce crew workload from typical pilot-vehicle interfaces.

Aircraft display system 400, various aspects of which are shown in FIGS. 4A and 5, was discussed herein as an example of a type of system in which various embodiments of display 100 can be used to provide a portion of desired FOV 102 (FIG. 1) as well as to monitor and control a large number of subsystems and sensors 404 (FIG. 4A). It is anticipated that embodiments of display 100, or group of displays 100, will be useful in providing an expanded field of view for operators of a wide variety of systems that have limited out-the-window visibility.

While the present disclosure describes various embodiments of display systems that can be used in a device with reduced out-the-window visibility, it will be understood that many variations and modifications of the embodiments disclosed herein may be made while remaining within the scope of the following claims. These embodiments are illustrative and the scope of the claims is not limited to them. For example, those having ordinary skill in the art will readily implement the processes necessary to provide the structures and methods disclosed herein, and will understand that materials, dimensions, processes, and other parameters can be varied to achieve desired apparatus, methods, and systems within the scope of the following claims.

What is claimed is:

1. A display system for a device with reduced out-the-window visibility, comprising:
   a display device;
   a display processor operable to:
   receive an image from a sensor, wherein the sensor is capable of providing an image of an area outside the device that is at least partially obscured from view of an operator by a portion of the device's structure;
   combine the sensor image with symbols representing information regarding the operational state of the device;
   output the combined sensor image and symbols on the display device, wherein the display device is positionable to provide a portion of the out-the-window field of view to the operator, and the entire desired field of view for the operator is provided by the display device in combination with the out-the-window scene available through windows of the device; and
   determine the role of the operator and to display a preconfigured display image based on the operator's role.

2. The display system of claim 1, wherein the display processor is configured to display the combined sensor image and symbols during one phase of operation, and another display image during another phase of the operation.

3. The display system of claim 1, wherein one of the preconfigured display images includes the combined sensor image and the symbols represent pre-selected operational information that is displayed during a predefined operational state.

4. The display system of claim 1, wherein another preconfigured display image comprises a plurality of mutually exclusive windows of information, wherein the windows include information related to the device and various subsystems of the device.

5. The display system of claim 4, wherein the display processor is further configured to generate a common display area associated with at least two of the windows, wherein the common display area can be customized by the operator to display detailed information related to the information displayed in the associated windows.

6. The display system of claim 1, wherein the display device includes a flat panel screen.

7. The display system according to claim 4 further comprising:
   a user input device configured to transmit operator input data to the display processor to enable the operator to select options for the display image.

8. The display system according to claim 5 wherein:
   the common display area includes a scroll option to allow the operator to scroll through the information in the common display area.

9. The display system according to claim 4 wherein:

one of the plurality of windows includes advisory information regarding the status of the subsystems.

10. The display system according to claim 9 further comprising:
a selectable option to acknowledge the advisory information, wherein the advisory information is cleared from the display when the acknowledge option is selected.

11. The display system according to claim 4 further comprising:
a selectable option to display a checklist for at least one of the subsystems in one of the windows.

12. The display system according to claim 4 wherein:
one of the selectable options allows the operator to initiate diagnostic procedures for at least one of the subsystems.

13. The display system according to claim 4 wherein:
one of the selectable options allows the operator to display operational history for at least one of the subsystems.

14. A display system for an aircraft, comprising:
a display device;
a display processor operable to:
receive an image from a sensor, wherein the sensor is capable of providing an image of an area outside the aircraft that is at least partially obscured from view of a crewmember by a portion of the aircraft's structure;
output the sensor image on the display device, wherein the display device is positionable to provide a portion of a desired out-the-window field of view to the crewmember, and the entire desired field of view for the crewmember is provided by the display device in combination with the out-the-window scene available through cockpit windows of the aircraft; and
determine the role of the crewmember and to display a preconfigured display image based on the crewmember's role.

15. The display system of claim 14, wherein the display processor is configured to combine the sensor image with symbols representing information regarding the operational state of the aircraft, and display the combined sensor image and symbols during one phase of flight, and another display image during another phase of the flight.

16. The display system of claim 14, wherein one of the preconfigured display images includes the combined sensor image and the symbols represent primary flight information that is displayed below a predefined altitude.

17. The display system of claim 14, wherein another preconfigured display image comprises a plurality of mutually exclusive windows of information, wherein the windows include information related to the aircraft and various aircraft subsystems.

18. The display system of claim 17, wherein the display processor is further configured to generate a common display area associated with at least two of the windows, wherein the common display area can be customized by the crewmember to display detailed information related to the information displayed in the associated windows.

19. The display system of claim 14, wherein the field of view of the display device is approximately −20 degrees to +20 degrees horizontally.

20. The display system of claim 19, wherein the field of view of the display device is approximately −10 degrees to −30 degrees vertically.

21. The display system of claim 14, wherein the display device includes a flat panel screen.

22. The display system according to claim 17 further comprising:
a user input device configured to transmit crewmember input data to the display processor to enable a user to select options for the display image.

23. The display system according to claim 18 wherein:
the common display area includes a scroll option to allow the crewmember to scroll through the information in the common display area.

24. The display system according to claim 17 wherein:
one of the plurality of windows includes advisory information regarding the status of the subsystems.

25. The display system according to claim 24 further comprising:
a selectable option to acknowledge the advisory information, wherein the advisory information is cleared from the display when the acknowledge option is selected.

26. The display system according to claim 17 further comprising:
a selectable option to display a checklist for at least one of the subsystems in one of the windows.

27. The display system according to claim 17 wherein:
one of the selectable options allows the crewmember to initiate diagnostic procedures for at least one of the subsystems.

28. The display system according to claim 17 wherein:
one of the selectable options allows the user to display operational history for at least one of the subsystems.

29. An aircraft, comprising:
a crewstation with cockpit windows;
a first flat panel display device for one crewmember;
a second flat panel display device for another crewmember; and
a display processor operable to:
receive a first sensor image, wherein the first sensor image includes an image of the area outside the aircraft that is at least partially obscured from view of the crewmembers by the nose of the aircraft;
translate the first sensor image to the viewpoint of each crewmember; and
output the translated sensor images on the respective display devices, wherein each display device is positioned to provide at least a portion of a desired out-the-window field of view from the viewpoint of the respective crewmember, wherein the display processor is operable to display a preconfigured display image based on the crewmember's role in operating the aircraft that includes the combined sensor image and symbols representing primary flight information that is displayed below a predefined altitude.

30. The aircraft of claim 29, wherein the display processor is operable to combine the sensor image with symbols representing information regarding the operational state of the aircraft.

31. The aircraft of claim 29, wherein the display processor is further configured to:
receive a second sensor image of a portion of the out-the-window scene; and
fuse the first and second sensor images into a combined sensor image.

32. The aircraft of claim 31, wherein the display processor is further configured to:
translate the combined sensor image to the viewpoint of each crewmember; and
output each translated combined sensor image to the respective display device.

33. The aircraft of claim 31, wherein the second sensor image provides an enhanced out-the-window field of view compared to the first sensor image in low visibility conditions.

34. The aircraft of claim 33, wherein the display processor is configured to display the combined sensor image and symbols during one phase of flight, and another display image during another phase of flight.

35. The aircraft of claim 29, wherein another preconfigured display image comprises a plurality of mutually exclusive windows of information, wherein the windows include information related to the aircraft and various aircraft subsystems.

36. The aircraft of claim 35, wherein the display processor is further configured to generate a common display area associated with at least two of the windows, wherein the common display area can be customized by the crewmember to display detailed information related to the information displayed in the associated windows.

37. The aircraft of claim 31, wherein the field of view of the display device is approximately −20 degrees to +20 degrees horizontally.

38. The aircraft of claim 37, wherein the field of view of the display device is approximately −10 degrees to −30 degrees vertically.

39. The aircraft according to claim 35 further comprising:
a crewmember input device configured to transmit crewmember input data to the display processor to enable a crewmember to select options for controlling the subsystems and the display processor.

40. The aircraft according to claim 29 further comprising:
a third display device positioned between the first display device and the second display device, wherein the display processor is further configured to output an image of a moving map on the third display device, and to present an option to toggle display of the moving map image with another display image comprising a plurality of mutually exclusive windows of information, wherein the windows include information related to the aircraft and various aircraft subsystems.

41. The aircraft according to claim 40, wherein:
one window of the display image includes navigation information;
another window of the display image includes aircraft attitude and speed information;
another window of the display image includes engine information; and
another window of the display image includes advisory information.

42. The aircraft according to claim 29 further comprising:
a terrain database coupled to the display processor to provide at least a portion of the desired out-the-window field of view on the display device.

43. The system of claim 1, wherein the display processor is further operable to crop, scale, rotate, and translate the image to conform to real world scenery for an operator's viewpoint.

* * * * *